Sept. 12, 1933.  E. W. EASTER  1,926,269
POWER TRANSMISSION
Filed Feb. 25, 1932  2 Sheets-Sheet 1
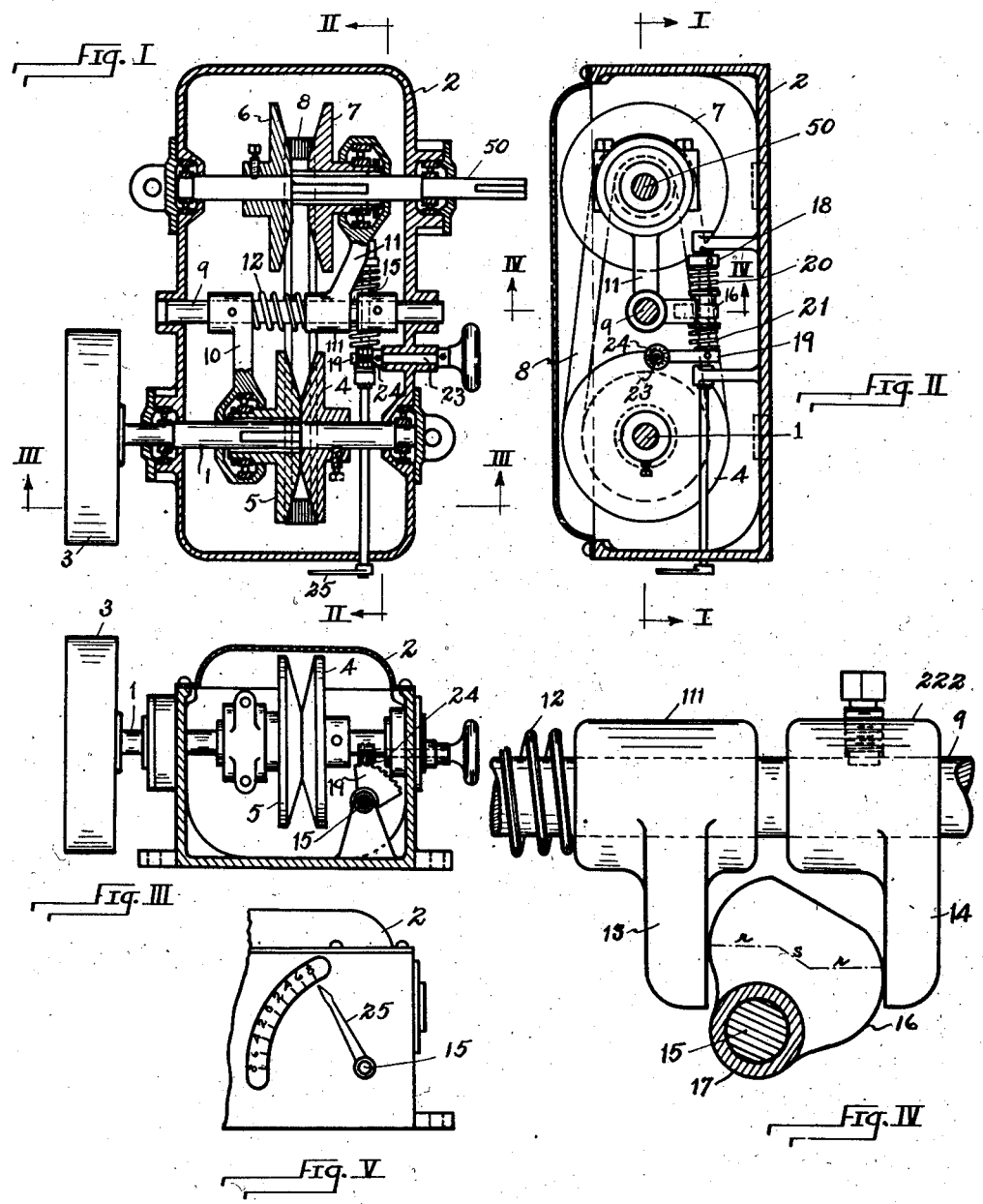
INVENTOR
Elmer W. Easter
by Christy, Christy and Wharton
his attorneys

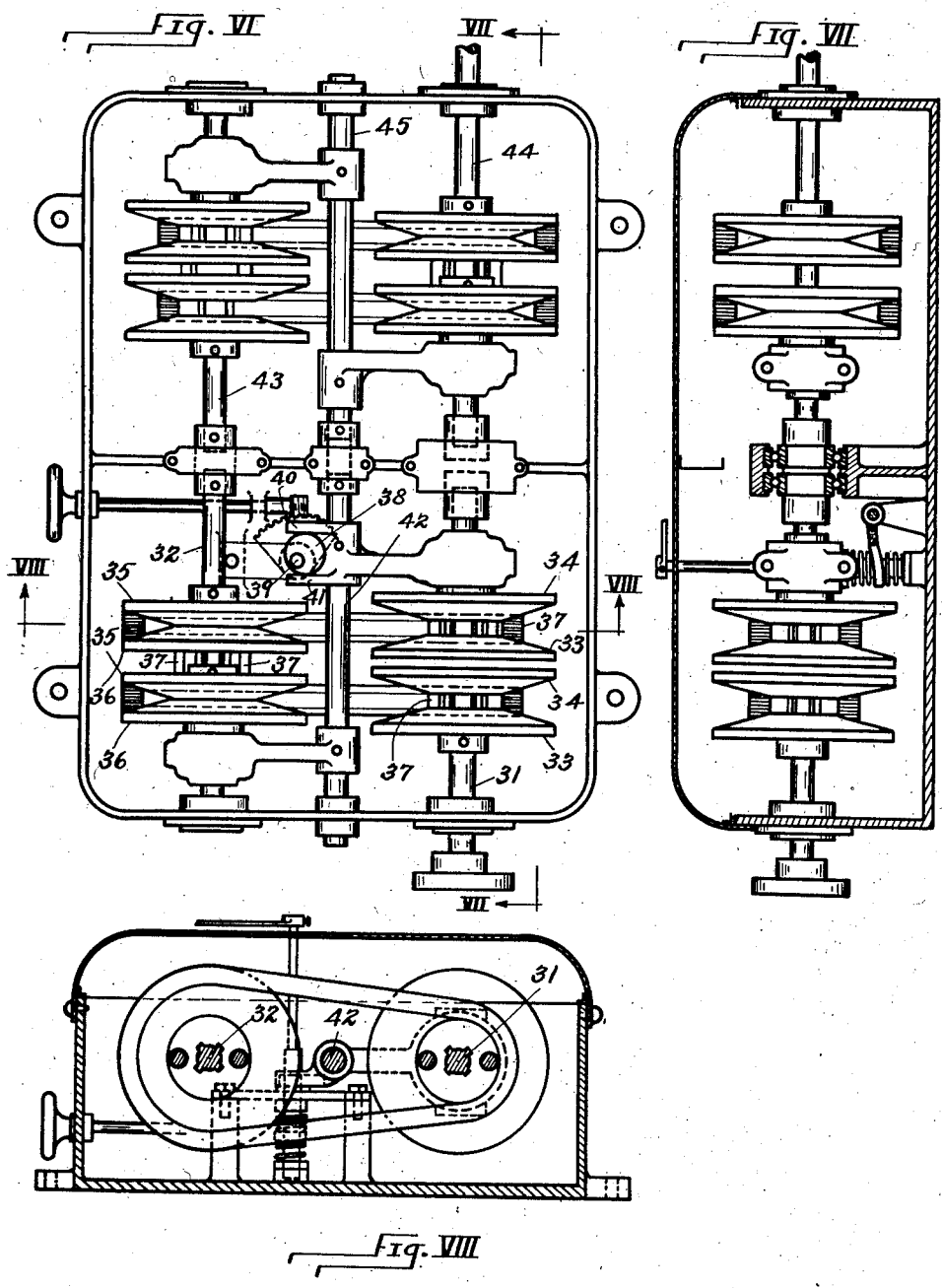

Patented Sept. 12, 1933

1,926,269

UNITED STATES PATENT OFFICE 1,926,269

POWER TRANSMISSION

Elmer W. Easter, Coraopolis, Pa.

Application February 25, 1932. Serial No. 595,062

10 Claims. (Cl. 64—8)

This invention relates to power transmission and consists in a speed-changing device which is simple and durable. It is characterized by the facts: (1) that the moving parts are spring-backed, and, accordingly, that in their operation these parts accommodate themselves to stress; (2) that the speed ratio (and, conversely, the power ratio) as between power shaft and driven shaft, when changed, is changed gradually; (3) that, within the range contemplated, any ratio which circumstances may dictate may be established and maintained; (4) that while the machinery in which this device is included is at rest, certain controlling parts may be shifted to positions proper for establishing any desired speed (and power) ratio, so that, when thereafter the machinery resumes movement, that desired ratio may be made effective; and (5) that in changing the speed (and power) ratio a belt-tightening device is automatically effective, to maintain the belt which forms part of the device taut at all times.

A speed-changing device in which my invention is found is illustrated in the accompanying drawings. Fig. I is a view in section, on the common axial plane of the power and driven shafts. This plane is in Fig. II indicated by the line I—I. Fig. II is a view in section, on the plane indicated at II—II, Fig. I. Fig. III is a view in section, on the plane III—III, Fig. I. Fig. IV is a fragmentary view to larger scale and in section, on the plane indicated at IV—IV, Fig. II. Fig. V is a fragmentary view in end elevation, showing the device as it might be viewed in a direction from the bottom upwardly, Fig. I. Fig. VI is a view in plan from above (the cover of the case having been removed) of another embodiment of the invention. (The belts in this instance are shown in section.) Figs. VII and VIII are views in section, on the planes indicated at VII—VII and VIII—VIII, Fig. VI.

The power shaft 1, mounted for rotation in the casing 2, is driven in any suitable manner; means of rotation are conventionally indicated by a belt pulley 3. The shaft carries a pair of complementary cone-pulley parts, one of which, 4, is shown to be fixed to the shaft, while the other, 5, splined to is capable of sliding longitudinally upon the shaft, to increase and diminish the interval at which its conical face stands spaced from the conical face of its companion member, 4.

The driven shaft 50, also mounted for rotation in casing 2, extends in parallelism with power shaft 1, and similarly carries a pair of cone-pulley parts, one of which, 6, is fixed, the other, 7, is capable of sliding upon the shaft, relatively to its fellow.

The two cone pulleys so constituted are (with minor departure, incident to movability of parts) arranged in a common medial plane (which is perpendicular to the axes of the two shafts 1 and 50), and they are encircled by a belt 8. The belt is of substantial breadth, and of such rigidity as to engage each pulley at increasing radial distance from the axis of rotation as the parts of the pulley approach one another more nearly; and, conveniently, the belt is of the tapered cross-section shown, with angularly disposed opposite surfaces, adapted to fit against the conical faces of the pulley.

Means are provided for shifting simultaneously, and in complementary direction and degree, the movable pulley parts 5 and 7, to the end that in all positions the belt 8 engaging the pulleys shall extend in a path of substantially constant length, and that as the parts are shifted the speed of the driven shaft shall vary, relatively to the speed of the power shaft. These shifting means include a shaft 9, mounted in the casing 2, extending in parallelism with shafts 1 and 50, and reciprocable in axial direction, and in connections between the shaft 9 and the pulley parts 5 and 7. An arm 10 upon shaft 9 carries pulley part 5 on shaft 1, in such manner that pulley part 5 is free to rotate independently of arm 10 and in unison with shaft 1; and arm 11 upon shaft 9 carries the pulley part 7 on shaft 50 and in such manner that pulley part 7 is similarly free to rotate in unison with shaft 50.

It will be observed that the two movable pulley parts 5 and 7 are arranged, one on the left, the other on the right, of its companion, stationary pulley part, and that, consequently, the reciprocation of shaft 9 effects simultaneously increase in the effective size of one pulley and decrease in the effective size of the other, and that reversal in direction of reciprocation of shaft 9 causes diminution in the effective size of that pulley which had been increasing, and increase in the size of that one which had been diminishing.

One of these two arms, the arm 10, is rigidly borne by the shaft 9 and responds as an integer to the reciprocation of the shaft; the other arm, 11, extends from a hub 111, and hub 111 encircles shaft 9 and is movable in axial direction relatively to shaft 9. Adjacent the hub 110

111 on one side, another hub, 222, is rigidly secured to the shaft 9. Upon the opposite side a spring 12 has bearing upon hub 111; and the spring tends to shift the hub 111 upon the shaft 9 in a direction toward the fixed hub 222. Conveniently the spring 12 is an expansion spring resting at its opposite end upon a base which is integral with shaft 9, and in this case the arm 10 serves as such a base.

From the hubs 111 and 222 extend two arms 13 and 14. The arrangement is conveniently such as shown, in that the arms 11 and 13 extend perpendicularly one to the other from the hub 111, and the two arms 13 and 14 extend in parallelism and face to face.

A shaft 15 is rotatably mounted in casing 2. It is arranged adjacent to shaft 9 and extends in such direction that the axes of the two shafts, being projected in a plane to which they both are parallel, are perpendicular to one another (cf. Fig. I). The shaft 15 carries, loose and rotatable upon it, a block 16. The block 16 extends between the arms 13 and 14, and constitutes a spacer, defining the interval at which, under the tension of spring 12, the two arms 13 and 14 stand apart. The block 16 is so shaped that, as it turns upon the axis of shaft 15 as a center, its effective size as a spacer changes; and, specifically, with reference to Fig. IV, as the block turns counter-clockwise, its effective width increases, and the interval, at which the arms 13 and 14 stand apart, increases.

The block 16 is not carried rigidly upon shaft 15; it extends from a sleeve-like hub 17 which is loose upon the shaft. The shaft 15 is equipped on opposite sides of block 16 with two rigid anchorages; one conveniently in the form of a collar 18, the other, for purposes presently to be described, the pinion 19 of a worm gear. Two springs 20 and 21, anchored severally at their ends to anchorages 18 and 19, are at their opposite ends secured to block 16. Rotation of shaft 15 is thus imparted to block 16 through yielding members, the springs 20 and 21.

Means are provided for rotating shaft 15, and such means conveniently consist of a manually rotatable shaft 23, mounted in casing 2, arranged adjacent to and transversely with respect to shaft 15. Shaft 23 carries a worm 24 which meshes with the aforementioned pinion 19. And, as particularly shown in Fig. III, the pinion 19 need be no more than a section of a complete circular pinion.

The shaft 15 may be prolonged and provided, externally of casing 2, with an index arm 25, to show the transmission ratio to which the shaft 15 is set.

It is manifest that, by the instrumentalities described, when shaft 23 is turned in one direction and shaft 15 turned counter-clockwise (Fig. IV), the consequent turning of block 16 is counter-clockwise, and hub 111 is shifted to the left. Tension then is increased on spring 12, and in response to such access of tension shaft 9 is shifted to the left. And it is further manifest that when thereafter the shaft 23 is turned in opposite direction and shaft 15 turned clockwise, abutment of the turning block 16 upon arm 14 will effect a return shifting of shaft 9 to the right.

Fig. I shows the lower pair of pulley parts, 4 and 5, in relative positions of closest approach, and the upper pair, 6 and 7, in relative positions of widest separation; and this figure, together with Fig. II, indicates that, when the pulley parts are so positioned, the lower pulley is of maximum and the upper of minimum effective diameter, and the transmission is at maximum in the matter of speed and at minimum in the matter of power. And it will be perceived that, when the pulley parts are in such positions, a shifting of shaft 9 to the left (Fig. I) will effect a decrease in the effective diameter of the lower pulley and a corresponding increase in the effective diameter of the upper pulley, and a diminution of the speed ratio, and an increase in the power ratio.

If the parts be running, while in the positions shown in Figs. I and II, and if then shaft 15 be turned counter-clockwise (Fig. IV) the block 16 will be effective, yieldingly but certainly to shift the ratio of transmission, reducing speed and increasing power; and if thereafter shaft 15 be turned clockwise, the ratio of transmission will be oppositely shifted, with increase of speed and reduction of power. If while the parts are at rest the shaft 15 be turned the block 16 will not immediately turn; but the springs 20 and 21 will be put under tension; and when thereafter running is resumed the tension of springs 20 and 21 will be effective to shift the ratio of transmission and bring it to the desired value. The index arm 25 will always indicate the position to which shaft 15 has been brought, and, accordingly, the ratio of transmission to which the apparatus is set.

It is characteristic of a pair of pulleys organized as here shown and described that, when their effective diameters are equal, the path of the belt is of minimum length; and that, as one of the pulleys increases in effective diameter while the other diminishes, the path of the belt increases in length. I make compensation for this in so forming block 16 that it becomes a belt-tightening and belt-loosening device. As has already been indicated, the position of block 16 between arms 13 and 14, Fig. IV, is that which obtains when the pulleys are in the adjusted position shown in Figs. I and II, in which case the belt-path is of maximum length. The effective width of block 16 as a spacer between arms 13 and 14 is then at a minimum. The block 16 is so shaped that, as it turns counter-clockwise (Fig. IV), its effective width increases to a maximum (corresponding to a ratio of 1:1 between the two pulleys) and then diminishes again. This characteristic may be attained by forming the arm-engaging faces of the block to circular arcs whose combined radii are less than the width of the block, and whose centers are spaced apart, as indicated in dotted lines, Fig. IV, at $r$, $r$, $s$.

The position of Figs. I and II is the high-speed position. Ordinarily, as for instance when the device is used as the transmission device of an automobile, the device goes into action with the adjustable parts at the opposite extremities of their ranges; that is to say, in low-speed position. Then as inertia is overcome adjustment may be made gradually, to such ratios of speed and power, within the permissible range, as may be desired.

The transmission device described is of general applicability in machinery between power shaft and work shaft.

Figs. VI–VIII will serve to indicate how the transmission element described may be elaborated. Instead of a single pair of pulleys, the power shaft 31 and the counter shaft 32 may be provided with two pairs of pulleys; the pulleys on the power shaft comprising each a fixed member 33 and a companion movable member 34, and the pulleys on the counter shaft comprising each a fixed member 35 and a movable member 36. The movable members of the several pairs are integrated by rods 37. In this instance (by way of variety in showing) the block 38 borne by the shaft 39 is a circular disk eccentrically placed, the arms 40 and 41 borne by the shaft 42 are fixed and are not relatively movable, and the structure lacks the belt-tightening feature found in the structure of Figs. I-IV. That feature, though desirable, is not essential. Otherwise, the control of the structure of Figs. VI-VIII is such as that already described.

Figs. VI-VIII serve, further, to show a second and duplicate transmission device, from the counter shaft 43 (which is integrated with shaft 32) to the driven shaft 44. The shaft 44, though arranged in axial alignment with, will be understood to be quite independent of, shaft 31. Between shafts 43 and 44 is a duplicate transmission mechanism. The shifting shaft 42 may be prolonged in an integral extension 45, and thus the whole set of movable gear parts may be shifted as a unit. And in this case the conjoint effect will be doubled: The speed reduction (or increase) from shaft 31 to shaft 32 will be duplicated from shaft 43 to shaft 44.

I claim as my invention:

1. In power-transmitting apparatus the combination of a power shaft and a work shaft arranged in parallelism, two compound conical pulleys borne one by each of said shafts and each including an adjustable member, and a belt engaging said pulleys, a third shaft arranged in parallelism with the said power and work shafts and reciprocable axially, the adjustable member of one of the pulleys being borne by said third shaft, spring-backed means for shifting the adjustable member of the other pulley, and spring-backed means for shifting said third shaft axially in response to shift of the adjustable member of such other pulley.

2. In power-transmitting apparatus the combination of a power shaft and a work shaft arranged in parallelism, two compound conical pulleys borne one by each of said shafts and each including an adjustable member, and a belt engaging said pulleys, a third shaft arranged in parallelism with the said power and work shafts and reciprocable axially, the said third shaft carrying an arm in which is rotatably borne the adjustable member of the pulley on the power shaft, spring-backed means for shifting the adjustable member of the pulley on the work shaft, and spring-backed means for shifting said third shaft axially in response to shift of the adjustable member of the pulley on the work shaft.

3. In power-transmitting apparatus the combination of a power shaft and a work shaft arranged in parallelism, two compound conical pulleys borne one by each of said shafts and each including an adjustable member, and a belt engaging said pulleys, a third shaft arranged in parallelism with said power and work shafts and reciprocable axially, two arms extending from said third shaft, one of which is movable longitudinally thereon, the adjustable members of the two said pulleys being rotatably borne, one by each of said arms, spring-backed means for shifting that arm which is movable upon said third shaft, and spring-backed means for shifting said third shaft in response to the shifting of the arm which is movable thereon.

4. In power-transmitting apparatus the combination of a power shaft and a work shaft, two compound conical pulleys borne one by each of said shafts and each including an adjustable member, a belt engaging said pulleys, a third shaft, a spring encircling said third shaft and adapted to be put under tension by the rotation of said third shaft, and means subject to the tension of said spring for simultaneously shifting the adjustable members of the two said pulleys.

5. In power-transmitting apparatus the combination of a power shaft and a work shaft, two compound conical pulleys borne one by each of said shafts and each including an adjustable member, a belt engaging said pulleys, a third shaft arranged in parallelism with the said power and work shafts and reciprocable axially, two arms extending from said third shaft, one of which is movable longitudinally thereon, the adjustable members of the two said pulleys being rotatably borne, one by each of said arms, a fourth shaft, a spring encircling said fourth shaft and adapted to be put under tension by the rotation of said fourth shaft, means subject to the tension of said spring for shifting that arm which is movable upon the third shaft, and spring-backed means for shifting said third shaft in response to the shifting of the arm which is movable thereon.

6. In power-transmitting apparatus the combination of a power shaft and a work shaft, two compound conical pulleys borne one by each of said shafts and each including an adjustable member, a belt engaging said pulleys, a third shaft arranged in parallelism with said power and work shafts and reciprocable axially, two arms extending from said third shaft, one of which is movable longitudinally thereon, the adjustable members of the two said pulleys being rotatably borne, one by each of said arms, a block movable in opposite directions and adapted to engage and shift either said third shaft or the arm which is movable upon said third shaft, a spring engaging the last-named arm and tending to resist movement thereof independently of said third shaft when the arm is under the impulsion of said member, and means for shifting at will the said block.

7. In power-transmitting apparatus the combination of a power shaft and a work shaft, two compound conical pulleys borne one by each of said shafts and each including an adjustable member, a belt engaging said pulleys, a third shaft arranged in parallelism with said power and work shafts and reciprocable axially, two arms extending from said third shaft, one of which is movable longitudinally thereon, the adjustable members of the two said pulleys being rotatably borne, one by each of said arms, a spring engaging that arm which as defined is movable upon said third shaft and offering yielding resistance to movement of the arm longitudinally of the shaft, a third abutment upon the said third shaft and spaced at an interval from the arm which as defined is longitudinally movable thereon, a shaft transversely arranged with respect to said third shaft and a block extending radially from such transversely arranged shaft and revoluble upon the axis thereof as a center, such block being situated relatively to the third shaft in the interval defined between two of the arms thereof, and means for revolving the block at will.

8. The structure of claim 7, the block being such in shape that as it turns on the axis of the shaft as a center its effective width as a spacing block changes.

9. The structure of claim 7, the block-revolving means including a block-engaging spring.

10. In power-transmitting apparatus the combination of a power shaft and a work shaft, two compound conical pulleys borne one by each of said shafts and each including an adjustable member, a belt engaging said pulleys, a third shaft arranged in parallelism with said power and work shafts and reciprocable axially, two arms extending from said third shaft, one of which is movable longitudinally thereon, the adjustable members of the two said pulleys being rotatably borne, one by each of said arms, a spring engaging that arm which as defined is movable upon said third shaft and offering yielding resistance to movement of the arm longitudinally of the shaft, a third abutment upon the third shaft and spaced at an interval from the arm which as defined is movable thereon, a shaft transversely arranged with respect to said third shaft and having a block loosely mounted thereon and extending radially therefrom and in the assembly extending into the interval at which the abutment named is spaced from the movable arm upon the third shaft, a spring connecting said block with the shaft upon which it is mounted, and means for rotating at will said transversely arranged shaft.

ELMER W. EASTER.